US008631395B2

(12) United States Patent
Sathyanathan et al.

(10) Patent No.: US 8,631,395 B2
(45) Date of Patent: Jan. 14, 2014

(54) INTER-PROCEDURAL DEAD CATCH HANDLER OPTIMIZATIONS

(75) Inventors: Patrick Sathyanathan, Bellevue, WA (US); Ten Tzen, Sammamish, WA (US)

(73) Assignee: Microsoft Corporation, Redmond ( * ) Notice: Subject to any disclaimer, the term of this patent is extended or adjusted under 35 U.S.C. 154(b) by 193 days.

(21) Appl. No.: 13/224,332

(22) Filed: Sep. 2, 2011

(65) Prior Publication Data

US 2013/0061215 A1    Mar. 7, 2013

(51) Int. Cl.
*G06F 9/45*    (2006.01)

(52) U.S. Cl.
USPC ............................ 717/157; 717/155; 717/156

(58) Field of Classification Search
USPC .................................. 717/140–143, 150–157
See application file for complete search history.

(56) References Cited

U.S. PATENT DOCUMENTS

| | | | |
|---|---|---|---|
| 6,000,028 A | 12/1999 | Chernoff et al. | |
| 6,857,120 B1 * | 2/2005 | Arnold et al. | 717/157 |
| 7,207,038 B2 * | 4/2007 | Bicsak et al. | 717/159 |
| 7,552,428 B2 * | 6/2009 | Stoodley et al. | 717/148 |
| 7,607,125 B2 * | 10/2009 | Shinnar et al. | 717/140 |
| 7,631,304 B2 * | 12/2009 | Bearman et al. | 717/156 |
| 7,669,193 B1 * | 2/2010 | Chipman | 717/152 |
| 7,721,275 B2 * | 5/2010 | Kestner et al. | 717/154 |
| 7,743,370 B1 * | 6/2010 | Krablin et al. | 717/156 |
| 7,757,224 B2 * | 7/2010 | Forin et al. | 717/157 |
| 7,779,394 B2 * | 8/2010 | Homing et al. | 717/136 |
| 7,926,046 B2 * | 4/2011 | Halambi et al. | 717/151 |
| 7,941,793 B2 * | 5/2011 | Kakivaya et al. | 717/148 |
| 8,141,064 B2 * | 3/2012 | Chipman | 717/154 |
| 8,266,609 B2 * | 9/2012 | Harris | 717/159 |
| 8,365,156 B2 * | 1/2013 | Sollich | 717/146 |
| 8,375,373 B2 * | 2/2013 | Sollich | 717/146 |
| 2007/0022414 A1 | 1/2007 | Bird | |
| 2009/0271771 A1 | 10/2009 | Fallows | |

OTHER PUBLICATIONS

Loguinov et al, Graph-Theoretic Analysis of Structured Peer-to-Peer Systems: Routing Distances and Fault Resilience, IEEE, vol. 13, No. 5, pp. 1107-1120, 2005.*
D'Elia et al, "Mining Hot Calling Contexts in Small Space", ACM pp. 516-527, 2011.*
Sibeyn et al, "Heuristics for Semi-External Depth First Search on Directed Graphs", ACM, 282-292, 2002.*
Mele et al, "The Early-Adopter Graph and its Application to Web-Page Recommendation", ACM, pp. 1682-1686, 2012.*
Spencer, et al., "LLVM's Analysis and Transform Passes", Retrieved at<<http://llvm.org/docs/Passes.html>>, Retrieved Date: Jul. 13, 2011, pp. 25.

(Continued)

*Primary Examiner* — Anil Khatri

(57) ABSTRACT

Whole program analysis during a link time code generation part of compilation can be used to detect and eliminate dead catch handlers. If all catch handlers of a try clause in a computer program are found to be dead then the try clause can also be eliminated. Detection of dead catches can be automatic, using iterative propagation of the types of thrown exceptions from callee function to caller function from bottom to top in the call-graph and iterative propagation of the types of in-flight exceptions from caller function to callee function from top to bottom in the call-graph.

15 Claims, 5 Drawing Sheets

(56) References Cited

OTHER PUBLICATIONS

Fu, et al., "Robustness Testing of Java Server Applications", Retrieved at <<http://ieeexplore.ieee.org/stamp/stamp.jsp?arnumber=01435351>>, IEEE Transactions on Software Engineering, vol. 31, No. 4, Apr. 2005, pp. 292-311.

Schilling, Jonathan, L., "Optimizing Away C++ Exception Handling", Retrieved at <<http://citeseerx.ist.psu.edu/viewdoc/download?doi=10.1.1.116.8337&rep=rep1&type=pdf>>, Proceedings on ACM Special Interest Group on Programming Languages, vol. 33, Issue 8, Aug. 1998, pp. 8.

"Quick Fix", Retrieved at <<http://help.eclipse.org/galileo/index.jsp?topic=/org.eclipse.jdt.doc.user/reference/ref-java-editor-quickfix.htm>>, Retrieved Date Jul. 13, 2011, pp. 3.

"Tree-SSA passes", Retrieved at <<http://gcc.gnu.org/onlinedocs/gcc-4.2.0/gccint/Tree_002dSSA-passes.html>>, Retrieved Date : Jul. 13, 2011, pp. 8.

\* cited by examiner

INTER-PROCEDURAL DEAD CATCH HANDLER OPTIMIZATIONS

BACKGROUND

Code that is never executed is sometimes referred to as "dead" code. When writing code, developers can inadvertently introduce dead code. Dead code adds to the size of the program. Dead code can slow down execution of the program by, for example, preventing effective use of the instruction cache at runtime. Moreover, the presence of dead code can inhibit code optimizations.

SUMMARY

Whole program analysis can be used to detect and eliminate dead code such as dead catches. If all catch handlers of a try clause in a computer program are found to be dead then the try statement can also be eliminated, reducing code size, and enabling the code to be optimized during compilation.

Detection of dead catches can be automatic, not requiring any annotations or information from the user. The whole program analysis that results in elimination of the dead catch handlers can include components that work iteratively, where the first component propagates the types of thrown exceptions from callee function to caller function in the call-graph and the second component propagates the types of in-flight exceptions that are caught by a catch clause from caller function to callee function in the call-graph. When an in-flight exception reaches a re-throw statement, i.e., a throw statement that does not specify an object to be thrown, the exception becomes a re-thrown exception.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
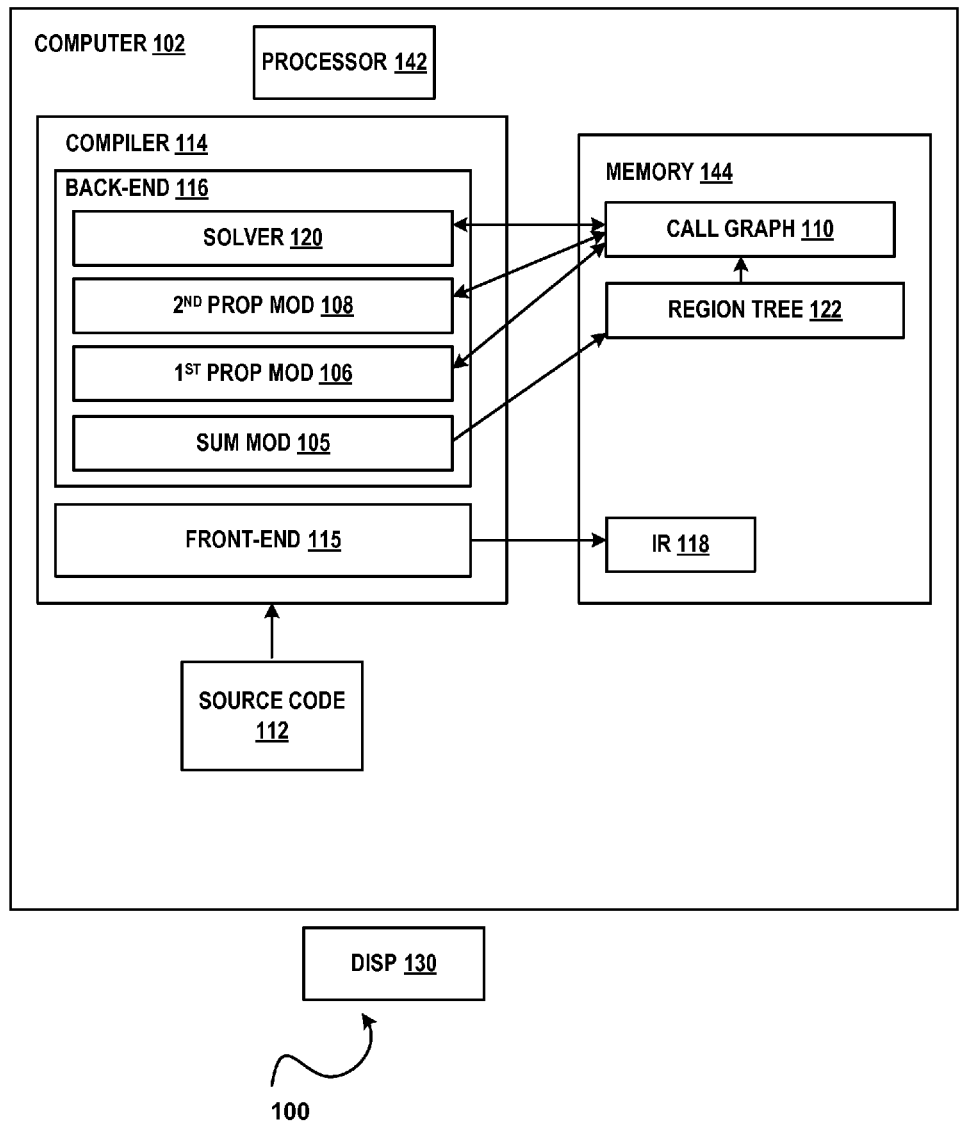
FIG. 1 illustrates an example of a system 100 that can automate dead code detection in accordance with aspects of the subject matter disclosed herein.

An exception is a condition that changes the normal flow of a program. For example, an attempt to divide by zero would likely generate an exception. Many computer languages, including but not limited to Actionscript, Ada, BlitzMax C++, C#, D, ECMAScript, Eiffel, Java, ML, Object Pascal (e.g. Delphi, Free Pascal, and the like), Objective-C, Ocaml, PHP (as of version 5), PL/1, Prolog, Python, REALbasic, Ruby, Visual Prolog and most .NET languages, have built-in support for exceptions and exception handling. In these languages, when an exception handled by the language is encountered, the stack of function calls is typically searched until an exception handler is found. For example, if a function f that includes a handler H for an exception E, calls function g, which in turn calls function h, and an exception E occurs in function h, then function h and function g may be terminated, and handler H in function f may handle exception E. In other words, the exception is propagated from function h to function g to function f in a bottom-to-top progression through a call-graph representing the calling relationships between the functions.

One way in which exceptions are implemented is by using a throw or raise clause with an exception object or a value of an extendable enumerated type. The scope for an exception handler typically starts with a marker clause (e.g., try, or the language's block starter such as begin) and ends in the start of the first handler clause (catch, except, rescue, etc.). One or more handler clauses can follow, each specifying the exception types the handler handles and what name the handler uses for the exception object. An example of exception handling code appears below:

```
try // This is a try statement with three catch clauses.
{
    if (i == 0)
    {
        // This is a throw statement that throws an object of type pointer to
        ZeroException.
        throw new ZeroException;
    }
    else if (i > 42)
    {
        // This is a throw statement that throws an object of type pointer to
    OutOfRangeException.
        throw new OutOfRangeException;
    }
    i = i + 1;
}
catch (ZeroException * e1)
{
    // This catch handler can catch objects of type pointer to
    ZeroException.
    printf("Caught ZeroException\n");
}
catch (OutOfRangeException * e2)
{
    // This catch handler can catch objects of type pointer to
    OutOfRangeException.
    printf("Caught OutOfRangeException\n");
}
catch (int i)
{
    // This catch handler can catch an exception of type int.
    // Since no operation within the try region throws an
// object of type "int" this catch handler is dead.
    printf("Caught int %d\n", i);
}
```

In programming languages such as but not limited to C++, an exception can be generated by a throw statement and can be caught and handled by a catch handler. A throw statement can specify one or more arguments (e.g., can generate an object) of a known type or can have no arguments. If the throw statement specifies arguments, one of the arguments of the call can identify the type of the thrown object. A throw statement can identify the types of catch handlers that it can be caught by. A catch handler typically has a type specification that identifies the types of exceptions that the catch handler can catch. When an exception is thrown, the runtime can match the type of each thrown object with a corresponding catch handler that catches that type of object. The first catch handler whose type matches the type of the thrown object can be invoked to catch the exception. If a match is found, the catch handler is live. If none of the thrown types match the type of the catch handler, the catch handler is dead. When an exception is caught, the function that caught the exception can re-throw the exception. Re-thrown exceptions typically do not have arguments.

Try/catch blocks can be nested to any level. For example, within the try part of one try/catch block, another try/catch block can be nested, and so on. Similarly one or more try/catch blocks can be nested within the catch part of the try/catch block to any level of nesting.

Sometimes, a developer can introduce exception handling constructs that are not needed. This can happen, for example, when the developer calls a function with which he is not familiar or when a developer uses standardized macros. The developer may wrap any call to an unfamiliar function in a try/catch block so that in case the called function throws an exception, the exception will be handled gracefully. Because the try/catch block is written without knowledge of what exceptions could be thrown, the code that is written may be redundant. For example, the developer may add a try/catch block for an exception that is already handled by the called function. The code that is written can be unnecessary. For example, the called function may not throw any exceptions that can be detected and therefore all the exception handlers are dead. Alternatively, the function may only throw exceptions of particular types, in which case, some of the exception handlers may be dead and some of the exception handlers may be live. While dead exception handlers do not increase program execution time per se, dead code can have adverse secondary effects on the instruction cache by taking up space in the instruction cache and thereby preventing live instructions from being placed in the cache.

In accordance with aspects of the subject matter disclosed herein, a program can be optimized by removing dead exception handlers, but in order to do so, knowledge of the whole program is needed. Analyzing one function at a time is insufficient because a function that calls another function can result in an exception being thrown. These types of exceptions would not be detected when analyzing the called function in isolation. In accordance with aspects of the subject matter disclosed herein, analysis and optimization can be performed during the link time code generation part of compilation, a point at which the compiler has a comprehensive view of the program as a whole, including all the libraries that are going to be linked and so on.

All the code for all the procedures in the program can be analyzed. For each procedure or function in the program, a summary information can be captured. The summary can include the following information: the nesting of try and catch blocks within the function, the types of exceptions thrown by the throw statements of the function, if the function has a re-throw or not, the types of exceptions that can be caught by each catch handler in the function and the set of functions called by the function. In accordance with aspects of the subject matter disclosed herein, a function can be considered to be comprised of regions and the summary information can be captured in a region tree comprised of nodes in which for each node of the region tree is stored: the types of exceptions thrown by throw statements within the region, for catch regions, the type of exceptions that can be caught by the catch region, the functions that are called within the region, whether or not a region has a re-throw (indicated by a Boolean value of a re-throw indicator) and whether or not a region calls an unknown function indicated by a Boolean value of an unknown function call indicator, needed because such callees can throw unknown exceptions.

To capture the nesting of the try/catch blocks within the function, a region tree can be built from the intermediate representation generated from the function by the front-end of the compiler. Information about the types of exceptions thrown by the function can be determined because a throw statement in the intermediate representation can appear as a call to a known runtime function or library, the call having descriptors that describe the types of exceptions thrown. For example, one of the arguments of the call to the known runtime function can identify the type of the thrown object. By examining all the arguments of all the calls to the known runtime function, the type of each object thrown by each throw statement in the function can be determined. This information can be added to the region tree for the function.

The throw statement can also include descriptors that identify the type of catch handlers that can catch the objects thrown. The type descriptors in the IR generated from the throw and catch statements can enable matching of throw and catch statements. This information can be added to the region tree of the summary. To determine if a catch statement is live, throw descriptors and catch descriptors can be compared. If throw and catch descriptors match, the catch statement is live. If no throw descriptors match a catch descriptor, the catch handler is dead, Information indicating dead catch handlers can also be added to the region tree. Finally, within a region tree for a function, the set of functions called by the function can be determined. This information can be added to the region tree. The region tree can be added to the call-graph node for the function.

An inter-procedural solver can receive the information (e.g., the summary such as an annotated region tree) and can use the information in the summary to compute the set of exception types that can be thrown or re-thrown within each region using well-known iterative data flow analysis techniques in which an iterative computation process is employed until a fixpoint is reached. That is, when a try or catch statement is found, the set of types that can be thrown within the try can be computed and can be matched with the type specification of each catch handler. The final set of thrown types for a try statement can be used to determine which of the associated catch handlers are dead (e.g., which catch handlers have no corresponding thrown exceptions). That is, a dead catch handler can be identified by failing to find a thrown exception of a type caught by that catch handler. The set of dead catch regions for a function can be stored in the call-graph node for the function. During the code generation pass of compilation, the dead catch regions cart be deleted from each function before other optimizations are performed and before machine code is generated.

As described above, if an exception is thrown within a called function the enclosing function typically handles the thrown exception. The thrown exception from the callee procedure is propagated to the caller procedure in a bottom up propagation over the call-graph. If a throw statement does not identify the type of exception object thrown, the throw is a re-throw. That is, if a called function throws an exception of a type that is caught by the calling function, the catch handler of the calling function will catch the exception thrown by the called function. The caught exception, which is termed an "in-flight" exception, can be re-thrown within the dynamic scope of the catch clause by a throw statement without an argument. This type of exception can be propagated over the call-graph in a downwards (top-to-bottom) direction. For example, suppose that inside the catch handler of a first function (e.g., function foo) there is a call to a second function (e.g., function bar). Inside the second function (bar) suppose there is a throw statement. The thrown object that was caught by the catch can be propagated downwards through the call-graph. When a re-throw is detected, the type of the in-flight exception can be translated into the type that it is being re-thrown by the current throw, thereby determining the type of the objects that are thrown by the re-throw statement.

In summary then, a summary for each function can be computed by building a region tree and storing the types of each throw statement and each catch handler on the region tree for each function in the call-graph. In inter-procedural propagation, a bottom up propagation of thrown exception types can be performed and a top down propagation for in-flight exception types can be performed so that a flag can be placed on each catch handler that is dead, Code associated with dead catch handlers can be removed. If all the catch handlers for a particular try statement are dead then the try statement itself and all its catch clauses can be removed. All the exception information that would normally be generated for the function that has the try catch can also be removed.

Inter-Procedural Dead Catch Handler Optimizations

FIG. 1 illustrates an example of a system 100 that automates detection of dead catch handlers in accordance with aspects of the subject matter disclosed herein. All or portions of system 100 may reside on one or more computers such as the computers described below with respect to FIG. 3, System 100 may execute on a software development computer such as the software development computer described with respect to FIG. 4. System 100 or portions thereof may execute within an IDE or may execute outside of an IDE. The IDE can be an IDE such as the one described with respect to FIG. 4 or can be any other IDE. All or portions of system 100 may be implemented as a plug-in or add-on.

System 100 may include one or more computers or computing devices such as a computer 102 comprising: one or more processors such as processor 142, etc., a memory such as memory 144, one or more modules such as summary module 105 that computes a summary for each function in the source program and stores the summary in a call-graph such as call-graph 110. System 100 may also include one or more modules such as a first propagation module 106 that propagates the types of thrown exceptions from callee (called) function to caller (calling) function in a call-graph such as call-graph 110 in a bottom-up direction and one or more modules such as a second propagation module 108 that propagates the types of in-flight exceptions from caller to callee function in a call-graph such as call-graph 110 in a top-down direction. System 100 may include other well-known components or modules that are not shown.

In operation, compilation of a source program such as source program 112 can be initiated on computer 102. A compiler such as compiler 114 can receive the source program 112. Compiler 114 can be a C++ compiler or any other suitable compiler. A compiler such as compiler 114 can determine the correctness of the syntax of a program, can generate correct and efficient object code, can perform run-time organizational tasks, and can format output in accordance with assembler and/or linker conventions. A compiler can include two main parts: a front-end such as front-end 115 and a back-end such as back-end 116. The front-end can determine whether the program is correctly written in terms of programming language syntax and semantics. Errors can be reported. Type checking can be performed by collecting type information. The front-end 115 can generate an intermediate representation or IR such as IR 118 from the source program 112 for processing by the back-end 116.

The back-end 116 can perform transformations for optimization, discovery and propagation of constant values, relocation or specialization of computation based on the context and so on. The back-end 116 can be responsible for translating the IR into machine code. Target instruction(s) can be chosen for each IR instruction, variables can be selected for registers and so on.

In accordance with aspects of the subject matter disclosed herein, the back-end 115 of the compiler 114 may include the summary module 105, the first propagation module 106 and the second propagation module 108. The summary module 105 can receive the IR generated from the front-end for a function and can generate the summary information for the function therefrom. The summary information can comprise a region tree, such as region tree 122, that is augmented with additional information. The augmented region tree can be added to the node of the call-graph 110 for the function. An inter-procedural solver 120 portion or module of the compiler 114 back-end 116 can receive or can access the augmented region tree in the call-graph 110 and can compute the set of exception types that can be thrown or re-thrown in each region tree. The first propagation module 106 and the second propagation module 108 can be accessed by the solver to compute the final set of thrown types for a try region using well-known iterative data flow analysis techniques. The final set of thrown types for the try region can be used to determine which of the associated catch handlers are dead. The set of dead catch regions for a function can be stored in the call-graph node for that function. During a code generation phase of compilation, the dead catch regions can be deleted from the IR representing the function in which they appear before other optimizations are performed and machine code is generated for the program.

Figure 2A:
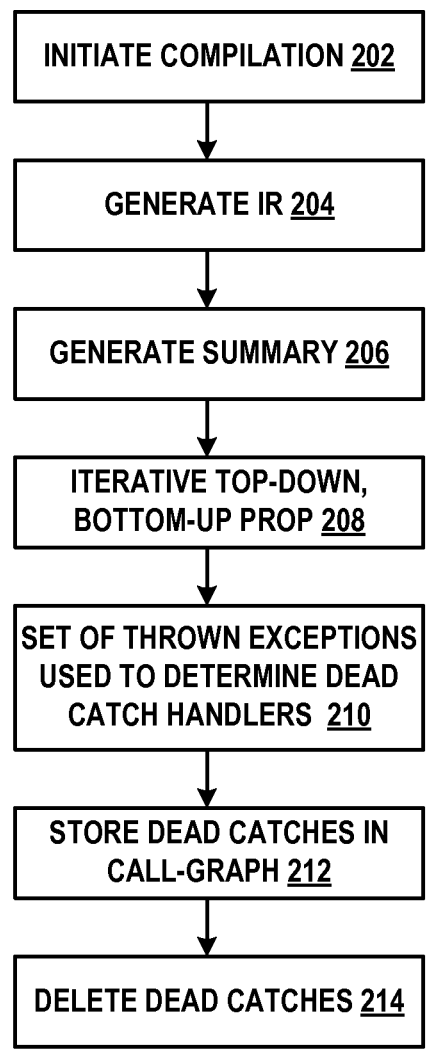
FIG. 2a illustrates an example of a method 200 for automating dead code detection in accordance with aspects of the subject matter disclosed herein.

FIG. 2a illustrates a method 200 that automates detection and removal of dead catch handlers in accordance with aspects of the subject matter disclosed herein. The method described in FIG. 2a can be practiced by a system such as but not limited to the one described with respect to FIG. 1. Some of the actions described below can be optional. Some of the actions described below can be executed in a sequence that differs from that depicted.

At 202 compilation of a source program can be initiated. At 204, IR can be generated by the front-end of the compiler. At 206 a summary can be generated by analyzing each procedure or function represented by the IR as described more fully below with respect to FIG. 2b. The summary information can be added to a region tree for each function. The region tree information can be added to the call-graph. At 208 the solver can access or retrieve summary information in the call-graph to compute a set of exception types that can be thrown or re-thrown within each region, where each region corresponds to a function. By iteratively propagating types of thrown exceptions from callee to caller functions in a bottom-upwards propagation direction and propagating types of re-thrown exceptions from caller to callee functions in a top-down propagation direction, a final set of thrown types for a try region can be determined. At 210 the final set of thrown types for a try region can be used to determine which of the catch handlers of a region are dead. At 212 the set of dead catch regions for a function can be stored in the call-graph node for that function. At 214 the dead catch regions can be deleted from each function before other optimizations are run and machine code is generated.

Figure 2B:
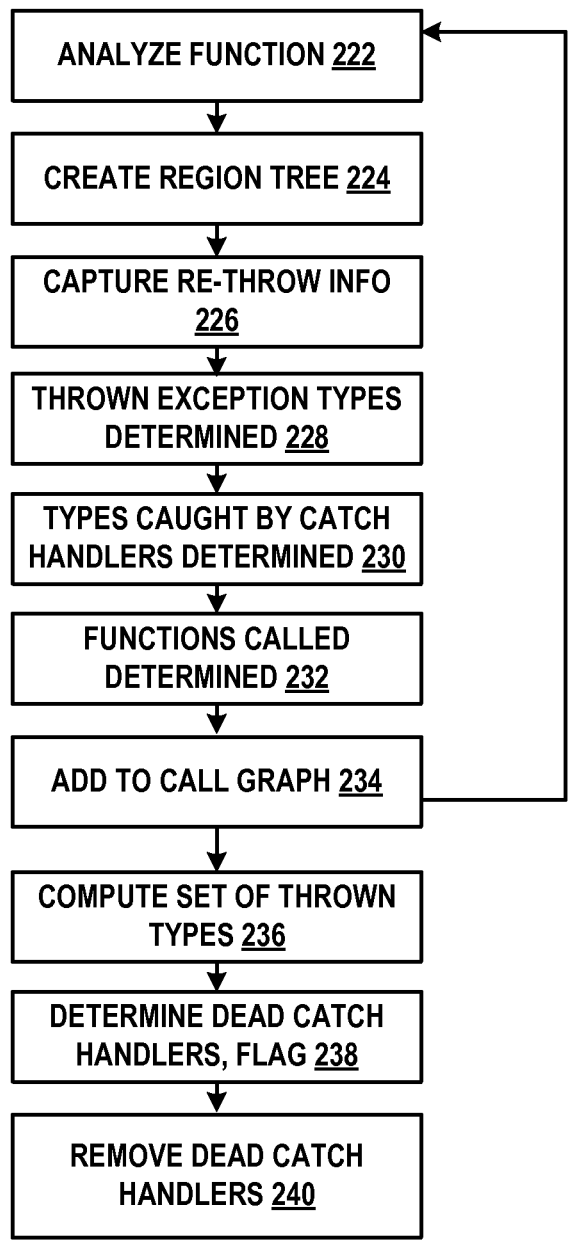
FIG. 2b illustrates a method 220 which is a more detailed example of portions of the method of FIG. 2a in accordance with aspects of the subject matter disclosed herein.

FIG. 2b illustrates a more detailed example of portions of the method of FIG. 2a. At 222 a procedure or function is analyzed. At 224 a data structure (e.g., a region tree) that describes the nesting of try and catch blocks within the function can be created. At 226, information that captures the presence or absence of one or more re-throw statements can be gathered and can be added to the region tree. An indicator that indicates that the region calls unknown functions or does not call unknown functions can be added to the region tree. At 228, the types of exceptions thrown by the throw statements of the function can be determined and added to the region tree. At 230 the types of exceptions that can be caught by each catch handler in the function can be determined and added to the region tree for the function. At 232 the set of functions called by the function can be determined. At 234 the summary information can be added to the call-graph for the function.

The processing described in 222 through 232 can be repeated for each function in the program. When all the functions have been summarized, the information can be used to compute the set of exception types which can be thrown or re-thrown within each function at 236. By iteratively propagating thrown exceptions from callee to caller function in the call-graph and types of re-thrown exception from caller to callee function in the call-graph for each function, a final set of thrown types for a try region can be used to determine dead catch handlers. To determine if a catch statement in a function is "live", throw descriptors and catch descriptors can be compared. Matching descriptors can be classified as live. If no throw descriptors match a catch descriptor, the catch handler can be flagged as dead. At 238, live or dead flags can be added to the region tree in the call-graph for the function. At 240, catch handlers flagged as dead can be removed from the code that is further optimized and from which machine code is generated.

Example of a Suitable Computing Environment

Figure 3:
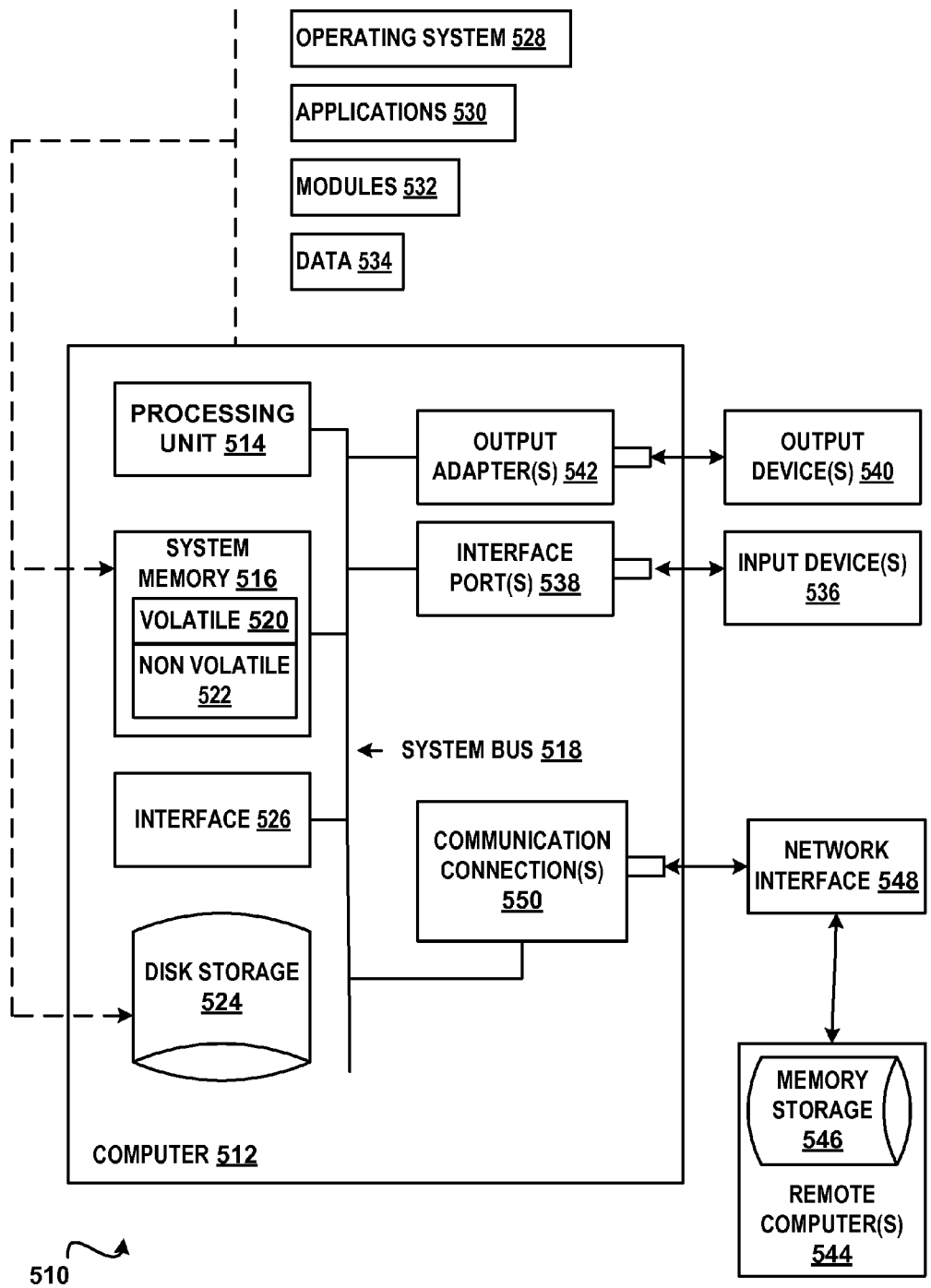
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
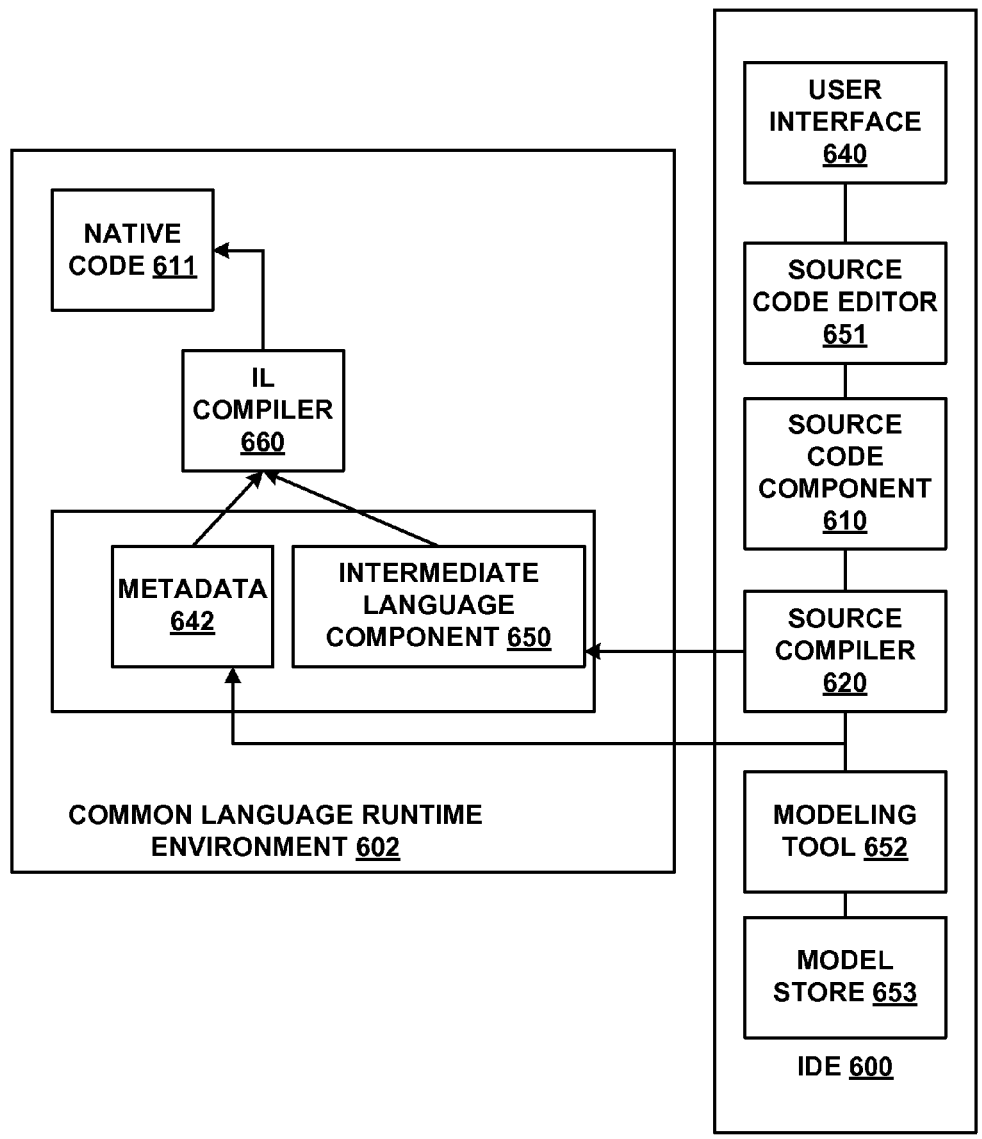
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory of the computing device; and
   at least one module loaded into the memory causing the at least one processor to:
   for each function in a computer program:
   receive intermediate representation from a compiler for a function:
   capture summary information for the function, the summary information comprising:
   a structure capturing nesting of try and catch statements within the function, the function comprising a plurality of regions;
   for each region of the plurality of regions of the function, types of exceptions thrown by the region;
   for each catch region of the plurality of regions of the function, types of exceptions caught by the catch region;
   for each region of the plurality of regions of the function, an indicator that indicates that re-throw statements are found within the region;
   for each region of the plurality of regions of the function, functions called by the region;
   for each region of the plurality of regions of the function, an indicator that indicates that the region calls unknown functions or does not call unknown functions; and
   add the summary information to a call-graph node for the function; and
   at least one module loaded into the memory causing the at least one processor to:
   compute a set of live exception types thrown by each function by iteratively propagating types of thrown exceptions from a callee function to a caller function in the call-graph in a bottom-up direction and propagating types of in-flight exceptions from a caller function to a callee function in the call-graph in a top-down direction until a fix point is reached;
   attempt to match catch handlers of each function with a corresponding set of thrown exceptions;
   identify a dead catch handler by failing to find a thrown exception of a type caught by the dead catch handler; and
   removing the identified dead catch handler, wherein in response to determining that all the catch handlers of a try statement of a try/catch block are dead, the try/catch block from the computer program is removed.

2. The system of claim 1, further comprising:
a solver module that computes a set of thrown exception types for each function.

3. The system of claim 1, further comprising:
a solver module that computes a set of in-flight exception types for each function.

4. The system of claim 2, further comprising:
a propagation module that propagates exceptions thrown by a called function upwards in the call-graph to a calling function.

5. The system of claim 3, further comprising:
a propagation module that propagates in-flight exceptions caught by a catch clause in a calling function, downwards in the call-graph to a called function.

6. The system of claim 1, wherein the computer program is a C++ program.

7. A method comprising:
for each function comprising a plurality of regions in a computer program:
building by a processor of a software development computer, a data structure capturing nesting of exception statements of a function;
adding to the data structure;
  a set of types of exceptions thrown by each region of the plurality of regions of the function;
a set of types of exceptions caught by each catch region of the plurality of regions of the function;
  an indicator that indicates presence or absence of re-throw statements within each region of the plurality of regions of the function;
  functions called by each region of the plurality of regions of the function;
for each region of the plurality of regions of the function, an indicator that indicates that the region calls unknown functions or does not call unknown functions;
  adding the data structure to a call-graph node for the function;
identifying dead code within the computer program by matching types of exceptions thrown by the function with types of exceptions caught by the catch handlers within the function, wherein unmatched catch handlers are determined to be dead, wherein an exception thrown from a callee function to a caller function is propagated from bottom to top in the call-graph and wherein an exception in-flight from a caller function to a callee function is propagated from top to bottom in the call-graph; and
  removing the dead code from the function, wherein in response to determining that all the catch handlers of a try/catch block are dead, removing the try/catch block from the computer program.

8. The method of claim 7, wherein the computer program is a C++ program.

9. The method of claim 7, wherein the dead code is identified during a link time code generation part of compilation.

10. The method of claim 7, wherein an intermediate representation of the function is received by the processor, the intermediate representation generated by a front-end of a compiler.

11. The method of claim 7, wherein a set of live exception types thrown by each function is computed by iteratively propagating types of thrown exceptions from a callee function to a caller function in the call-graph in a bottom-up direction and iteratively propagating types of in-flight exceptions from a caller function to a callee function in the call-graph in a top-down direction until a fixpoint is reached.

12. A computer-readable storage memory comprising computer-executable instructions which when executed cause at least one processor of a computing device to:
receive intermediate representation from a compiler front-end for a function:
capture summary information for the function from the intermediate representation, the summary information comprising:
a structure capturing nesting of try and catch statements within the function, types of exceptions thrown by the function, types of exceptions caught by catch handlers within the function, re-throw statements within the function and functions called by the function;
add the summary information to a call-graph for the function;
compute a set of live exception types thrown by each function by iteratively propagating types of thrown exceptions from a callee function to a caller function in the call-graph in a bottom-up direction and propagating types of in-flight exceptions from a caller function to a callee function in the call-graph in a top-down direction until a fixpoint is reached;
attempt to match catch handlers of each function with a corresponding set of thrown exceptions;
identify a dead catch handler by failing to find a thrown exception of a type caught by the dead catching handler; and
delete the identified dead catch handler; and
delete a try/catch block in response to determining that all the catch handlers of the try/catch block are dead.

13. The computer-readable storage memory of claim 12, comprising further computer-executable instructions, which when executed cause at least one processor to:
compute a set of exception types thrown by a function.

14. The computer-readable storage memory of claim 12, comprising further computer-executable instructions, which when executed cause at least one processor to:
compute a set of in-flight exception types in a function.

15. The computer-readable storage memory of claim 12, comprising further computer-executable instructions, which when executed cause at least one processor to:
of exception types re-thrown by a function.

* * * * *